May 17, 1966          J. E. LOONEY          3,251,545

LAND MEASURING DEVICE FOR DIVERSE AGRICULTURAL EQUIPMENT

Filed April 20, 1964

INVENTOR
JOE EDD LOONEY

BY

ATTORNEYS

United States Patent Office 3,251,545
Patented May 17, 1966

3,251,545
LAND MEASURING DEVICE FOR DIVERSE AGRICULTURAL EQUIPMENT
Joe Edd Looney, Proctor, Ark., assignor to Looney Acre Meters, Inc., a corporation of Arkansas
Filed Apr. 20, 1964, Ser. No. 360,840
4 Claims. (Cl. 235—95)

This invention relates to a device for measuring land areas, and more particularly to an attachment for employment with tractors and the diverse cultivating implements or related equipment associated therewith which will accurately indicate the acreage or other areal measurement of the land traversed by the cultivating or similar equipment, as well as the speed thereof.

In farming operations generally, and particularly with respect to cultivation, fertilization, seeding and related operations over tracts of land, there is an increasingly urgent need for some relatively simple and inexpensive means to reasonably accurately indicate the expanse of land being operated upon. Thus, in plowing our similar earthworking operations, as well as for the most economical and efficient distribution of materials during seeding, insecticide and fertilization treatments and the like, and for the proper determination of wage and material costs, the expanse of land covered by the tractor operator and his equipment must be capable of ready determination. At the present time such areal measurement of less than the entire tract is done largely by practiced or educated guess, or where an entire given land tract is treated at one time, of course, the treated acreage corresponds to the known area of the land. As a collorary thereof, it is important in many farming operations to also know the rate, i.e., speed, of travel and therefore the rate of product application to the ground undergoing treatment. It is readily apparent that an excess dosage of seed or of insecticide, for example, is not only economically wasteful but may be indeed detrimental to the proper growth or control desired.

It is therefore a principal object of my invention to provide a novel, yet inexpensive, device which may be attached to tractor-drawn farming equipment which will readily and accurately indicate the areal expanse of land traversed, for the purpose of adjusting sowing or spreading rates to maximum efficiency as well as to determine wage, labor and supply costs.

It is an important object of my invention to proivde a measuring device wherein a plurality of readily interchangeable indicator drive wheels are correlated in diameter with the varying transverse widths of commonly employed agricultural equipment, such as disc cultivators, insecticides, spreaders, seeders, harvesters, etc., whereby accurate areal reading are obtained regardless of the agricultural equipment used, by means of the single substitution of drive wheels and without alteration or dismantling of the remainder of my device.

A further feature correlative thereto resides in the provision of a plurality of speed-indicating meter faces, whose indicia is calibrated in accordance with the respective drive wheel diameters, whereby accurate ground readings may be obtained as necessitated.

It is a further object of my invention to provide an indicating device which provides accurate areal and speed indication whether the terrain being worked is irregular, as in the case of plowed ground, or whether the land expanse is relatively level and not materially broken or irregular in surface contour.

Other objects and advantages of my invention will be apparent from the following detailed description taken in connection with the accompanying drawings, in which FIG. 1 is a partially diagrammatic side elevation of a tractor which has attached thereto as by conventional drawbar equipment a representative earth treating device, such as a multi-row disc cultivator.

Figure 1:
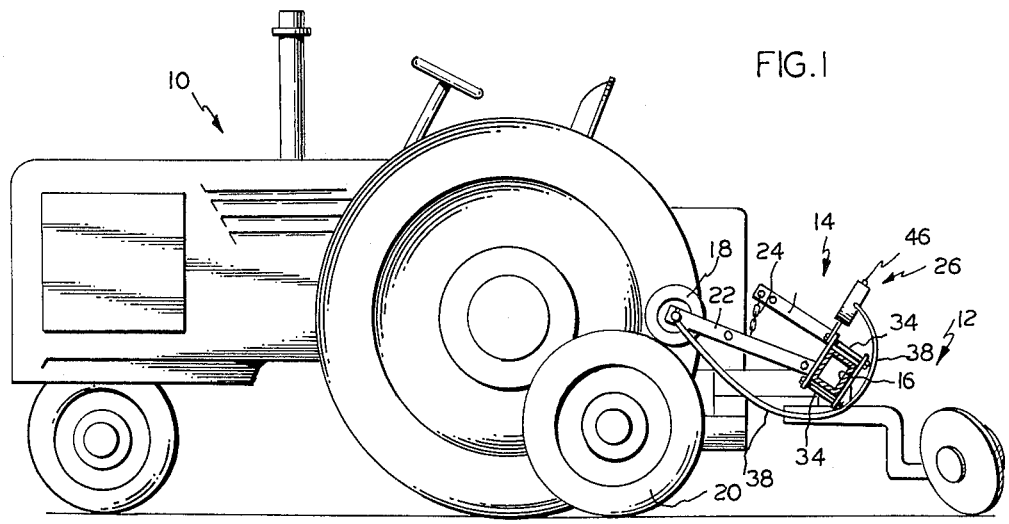

Referring to the drawings which illustrate a preferred and operative embodiment of my invention, I have shown in general outline a tratcor 10 of conventional form to which has been detachably secured by conventional drawbar means a piece of equipment 12 for farming operations, exemplified by a disc cultivator. Detachably affixed to the equipment 12 is my measuring device 14, which is clamped by bolt means as hereinafter described to the usual transverse frame member 16 of the auxiliary equipment 12, and wherein the drive wheel 18 of the measuring device 14 rides upon the tread of a conventional ground support wheel 20 associated with the equipment 12.

The measuring device or acre meter 14 in the illustrated form thereof comprises in addition to the indicator drive wheel 18, the pivoted support arms 22 therefor, the lift chain 24, and the indicating meter element proper at 26.

Figure 3:
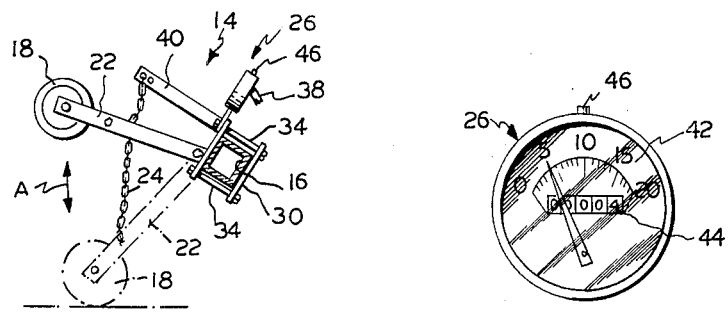
FIG. 3 is a diagrammatic side elevation of my device showing the connection thereof to the drawn equipment and illustrating two alternate positions of use as in contact with a ground support wheel of the drawn equipment or in direct contact with the ground.
Figure 4:
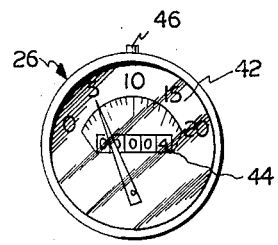
FIG. 4 is a plan view illustrating the face of the meter indicator employed as a part of my invention.

The wheel support arms 22 are maintained in rigidly spaced relationship to each other by means of one or more spacer sleeves 25 and a pivot tube 28, the latter being affixed as by welding to the forward clamping plate 32 which is secured against the transverse frame element 16 of the auxiliary equipment 12. The arms 22 are provided with transversely aligned apertures at appropriate locations therealong, whereby the spacer sleeve 25 and the pivot tube 28 receive therethrough securing bolts 29. The bolt 29 extending through arms 22 and sleeve 25 is securely tightened to clamp the several elements together, but the bolt 29 extending through pivot tube 28 is provided with a conventional lock nut means to rotatably secure the arms 22 to tube 28, whereby the drive wheel mounting arm assembly 22 is free to pivot about the axis of tube 28 through an arc indicated by the arrow A in FIG. 3. The distal end arms 22 carry an indicator drive wheel 18, the same being removably mounted within bearings disposed at the ends of the arms 22. The pivoted wheel arm assembly 18, 22 is affixed to the equipment frame member 16 by means of a forward clamping plate 32 and back plate 30 connected by transverse bolts 34 extending on either side of the frame element 16, whereby the same may be quickly and readily attached to or detached therefrom. Secured to the forward plate 32 and upstanding therefrom, is a bracket 36 for supporting the meter 26 as by bolt or screw connections to the housing thereof.

Drive between the measuring wheel 18 and the indicating meter 26 is achieved in conventional fashion by means of a detachable flexible cable disposed within protective sheathing 38 and extending between the axle of wheel 18 and the gear mechanism within the meter 26, as is well known in the art.

Affixed to the clamping plate assembly is an elongated L-shaped chain-support bracket 40 which projects forwardly above and in relative proximity to the wheel support pivot arms 22. The arm 40 is apertured toward its outer extremity to detachably receive the end of a length of chain 24, which is hooked thereinto as by means of conventional S-hooks, and the chain is similarly detachably affixed to the spacer bar 25 or to the arms 22. The purpose of the chain 24 will appear hereinafter.

The meter 26 includes a removable and replaceable face plate having miles-per-hour indicia 42 thereon, and a conventional pivoted indicator therefor connected to the mechanism within the meter housing for indicating the speed at any given time. Also, there is provided a multi-row counter 44 which is calibrated and geared to indicate areal measurement such as acres and tenths of acres. Preferably, a reset button 46 is provided on the meter, so that the counter 44 may be reset to zero prior to a given farming operation.

The details of the internal meter structure are conventional, wherein the essential structure thereof is comparable to that of the speedometer-odometer type as manufactured, for example, for use on a bicycle or the like. Likewise the meter housing including removable cover, viewing window, and indicia plate elements are of conventional manufacture readily available in diverse forms and types on the open market. One such manufacturer supplying meter elements which I have found suitable for use as part of my invention is the Stewart-Warner Corporation, Instrument Division, Chicago, Illinois.

Operation

The advantageous use and effective operation of my novel device will now be described.

Auxiliary farming equipment 12 customarily drawn or propelled by a tractor 10 during farming operations is provided with a transverse frame element or similar member comparable to that at 16, to which the measuring device 14 is secured by means of the clamping plates 30, 32 as aforesaid.

Figure 2:
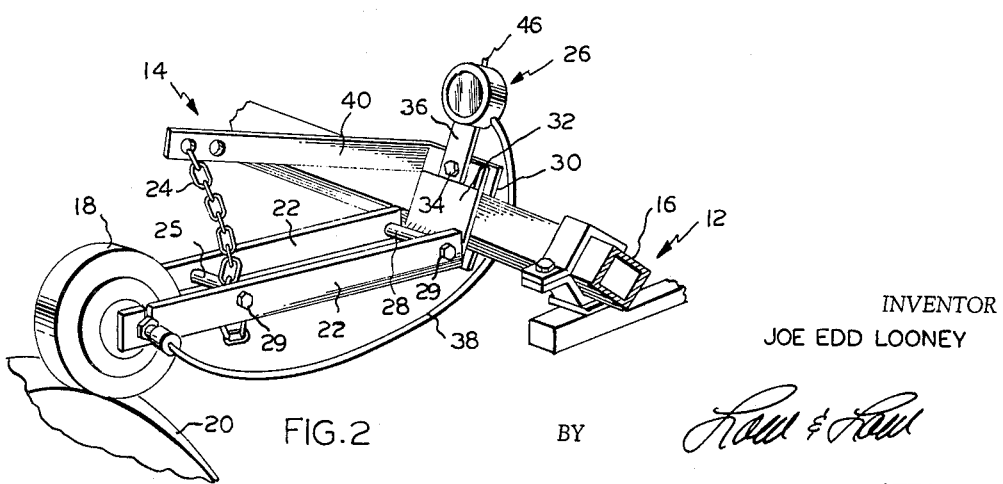
FIG. 2 is an enlarged perspective view of the measuring device of my invention as applied to the equipment frame and ground support wheel therefor as seen in FIG. 1.

While in the present instance a disc cultivator is shown at 12, the use of my measuring device is equally applicable and indeed necessary with all other usual types of farming equipment, including for example, seeders, insecticide distributors, harrows, harvesting attachments, etc. In the present instance, as is also conventional in much farm tractor-attached equipment, the accessory apparatus is provided with ground wheels as at 20 which support the frame assembly as at 16 to which cultivating discs or other ground or crop treating devices are affixed. The device 14 is aligned on the frame member 16 in the manner illustrated in FIG. 2, whereby the wheel support arms 22 are in longitudinal alignment with an equipment ground support wheel 20, and the drive wheel 18 is disposed in frictional contact with the tread of the equipment wheel 20.

In the instance of the auxiliary equipment having ground wheels 20 utilized for driving wheel 18, the provision of a chain 24 is not absolutely necessary, and is either removed entirely or connected between the arm 40 and the spacer 25 so as to provide a modicum of slack in the event of relative vertical movement between the frame 16 and the wheel 20. A measuring drive wheel 18 of appropriate diameter, as discussed hereinafter, is selected in accordance with the effective transverse width of the equipment drawn by the tractor 10, so as to thereby impart a reading in terms of acreage or areal expanse to the registering counter 44 of the meter 26. Thus, for example, when four-row ground treating equipment having a predetermined transverse width on the order of 12 feet, is drawn by tractor 10, it is apparent that the wheel 18 mounted between support bars 22 will be of relatively smaller diameter as compared to a slightly larger diameter wheel 18 that will be employed when two-row equipment or equipment of less transverse width is employed, to thereby accurately indicate a true reading of the areal expanse traversed by the equipment as the operator advances the same across the field, thereby obviating the necessity and difficulty of modifying the internal mechanism of meter 26.

It will be noted that in tractor-drawn equipment as is conventionally employed, the meter 26 relative to the support frame element 16 is mounted so as to face toward the driver's seat of the tractor, whereby the operator can readily inspect the face of the meter during operation to indicate the area traversed by the equipment, at any given time.

Further, as the tractor advances at any given speed, the same will likewise register upon the face of the dial by virtue of the indicating pointer thereon. It is of course apparent that the m.p.h. reading according to the pointer will vary in accordance with the selected diameter of the particular drive wheel 18 therefor, the indicated ground speed being higher for relatively wider equipment (and therefore a smaller diameter measuring wheel 18), and vice versa. However, it is found that in most cases the indicated speed is sufficiently close to that necessitated for the purposes contemplated so as to constitute only a negligible error. In the event, however, that more precise accuracy is required for the indicated speed of the tractor-drawn equipment in addition to the actual accurate area-measurement afforded by my invention, it is within the scope of my invention to provide a plurality of changeable face plates for the meter 26 to be supplied in sets with different diameter drive wheels 18. Thus, upon substitution of a different diameter drive wheel for different transverse width equipment, at the same time the previously employed dial face of the meter will be removed, and the corresponding dial face for that particular drive wheel 18 substituted therefor, the latter being calibrated in miles per hour in accordance with the different diameter of drive wheel 18. It will be seen that the substitution of the dial face of the meter is a simple change readily effected with the provision of a removable cover for the meter housing 26, and does not require any alteration of the internal gears or of the working parts of the odometer recording portion of the meter 26.

To give a particular example in connection with the foregoing, the equipment 12 being utilized may be on the order of 12.67 feet wide, as would be the case with four-row earthworking equipment having 38-inch spacing between the rows. Assuming that 2000 revolutions of the wheel 18 and therefore of the drive cable meter 26 are necessary to achieve a one-acre reading on counter 44, a 6½-inch diameter drive wheel 18 would be employed either in direct contact with the ground or with the tread of equipment wheel 20. Accordingly, when the tractor has advanced about 3438 feet across the field, one square acre would have been treated by the equipment 12, and so recorded on meter 26, as follows:

(1) equipment width×distance=area
    12.67 ft.×3438 ft.=43,560 sq. ft. or 1 acre
(2) distance÷wheel revolutions per acre
    3438 ft.÷2000=1.719 ft./rev.
(3) wheel circumference=wheel diameter×pi
    1.719 ft.=6½ in.×pi At the commencement of a subsequent farming operation, equipment 12 having a ten-foot width, for example, may be chosen for use (e.g., three 40-inch rows), in which case the previously employed 6½-inch diameter wheel 18 will be replaced with an 8-inch diameter wheel and connected to the motor cable. It then follows that upon traversing 4356 feet of field, the equipment will have again operated upon one square acre and been likewise recorded upon the meter, thus:

(1) 10 ft.×4356 ft.=43,560 sq. ft. or 1 acre
(2) 4356 ft.÷2000 rev./acre=2,108 ft. per rev.
(3) 2.108 ft. wheel circumference=8 in. d.×pi While the substitution of the appropriately sized drive wheel 18 corresponding to the width of the particular equipment 12 employed thus provides an accurate areal measurement during use of my apparatus, it will be apparent that by virtue of the approximate 18% difference in diameter between the two exemplary drive wheels, the miles-per-hour speed reading on the face of the meter when accurately indicated with a 6½-inch diameter wheel, will read slightly below actual speed with the use of larger diameter drive wheel 18, although the acreage indication will be accurate. Thus, if the equipment is traveling at 5 miles per hour, the meter face employed with the 6½-inch diameter will so indicate, but the same meter face with the 8-inch diameter wheel will indicate somewhat less or about 4.1 miles per hour. While the particular speed of the apparatus is not material in earthworking or ground breaking agricultural operations or in harvesting, the actual speed of the equipment may be relevant in connection with the distribution of seeds, fertilizers, etc., and for this reason an extra set of dial faces will be provided in accordance with the particular diameter of the drive wheels for use in connection therewith, whereby it will be seen that the substitution of a meter face plate having the indicia 42 on the meter face will provide an accurate speed indication as indicated by the meter pointer. Such substitution is readily effected and does not require any modification of the internal mechanism within the meter housing, and in any event the counter mechanism remains accurate.

It is likewise conventional in tractor-drawn equipment to provide means on the tractor for elevating the equipment, including any adjunct ground supporting wheels 20, above the ground at the completion of a particular operation, and prior to returning the tractor to its place of storage. Accordingly, when the equipment 12 is elevated as by means of the usual winch or hydraulic cylinder means, the wheels 20 will likewise be elevated, thereby terminating further drive of wheel 18, whereby the acreage reading of the counter 44 will remain for later convenient inspection and recordation thereof.

In this connection, the support and safety chain 24 performs a useful function when tractor-drawn equipment is employed which is not provided with an adjunct supporting ground wheel 20. In such case, the chain 24 is connected between support bar 40 and the spacer sleeve 25 so that the chain is slightly slack when the drive wheel 18 is in direct contact with the ground. As noted, the support arms 22 by virtue of their pivotal mounting at 28, are free to swing down to a ground-engaging wheel position as shown in phantom in FIG. 3. As before, with the wheel 18 in direct contact with the ground, the meter 26 will indicate the ground speed of the apparatus at any particular time, as well as the acreage covered by virtue of the registering counter 44. Further, as before, when the equipment 12 is elevated from the ground following completion of a particular farming operation, the chain 24 will then be drawn taut, and further lifting action with elevate the meter drive wheel 18 out of contact therewith, again terminating registering drive to the meter element 26.

It will thus be seen that I have provided a mechanically simple, yet highly efficient device which supplies a long felt and indeed increasingly critical need in agricultural operations wherein for both economical and practical purposes I provide not only a means of accurate areal measurement, but also an indication of rate of travel for the apparatus during its use. The latter function of my device is extremely desirable and important in certain farming operations. Thus, for example, in the application and distribution of chemicals such as pesticides, insecticides, fungicides, etc., in either liquid or granular form, the relative concentration thereof as applied to the ground or to the crops is a function not only of the rate of material supply to the dispensing orifices, but also is directly related to the speed of the apparatus traveling across the ground, wherein too low a speed would result in an excess concentration of the material in a given area or areas to the detriment of the crops therein, as well as being economically wasteful, whereas distribution thereof at an overly rapid speed would result in an unduly thin application of the material, whereby the effect desired may not be achieved and the time, labor, material and expense thereof is likewise wasted.

In the present era of highly competitive agricultural operations, mere estimates or empirical reckoning of acreage and speed cannot be tolerated. These serious disadvantages are obviated by my invention, wherein further my device, as noted, is readily transferable between and attached to diverse implements and equipment, as required.

The versatility of my invention is further shown in that the equipment operator is no longer compelled to operate the tractor in rectilinear paths, often necessary hitherto to aid in the "guesstimation" of the area covered. By virtue of the direct areal and speed readings provided by my invention, the operator may traverse angled, curved, sinuous, or other irregular paths as dictated by the terrain or the specific task to be accomplished, at all time being apprised of the area covered and the rate of speed with respect thereto.

Likewise the chain 24 by virtue of the adjustable ring connections therewith between the support arm 40 and the wheel support arms 22, is adjusted as needed to compensate for differing heights of various equipment from the ground, as well as preventing undue free play of the wheel 18 when driven off an auxiliary wheel of the equipment.

What I claim is:

1. Apparatus for interchangeable use with diverse pieces of agricultural equipment having various effective widths for measuring the land area traversed thereby, comprising
    mounting elements having means for detachably securing the same to a frame portion of a selected piece of agricultural equipment,
    a wheel support arm pivotally carried by said mounting elements,
    an area-indicating meter assembly rigidly carried by said mounting elements,
    a plurality of wheels for individual selective mounting on said wheel support arm, said wheels having diameters varying respectively in predetermined inverse relation to the width of a respective piece of agricultural equipment, whereby a particular wheel is selected for mounting on said arm in correspondence with the selected agricultural equipment to which said mounting elements are secured,
    and flexible means coupling said selected wheel and said meter whereby rotation of said wheel imparted by ground-traversing movement of said agricultural equipment produces an areal indication on said meter assembly.

2. A measuring device for use with ground-traversing agricultural equipment, comprising
    means for detachably securing said device to a frame member of the agricultural equipment,
    a wheel support arm pivotally mounted upon said securing means,
    a drive wheel detachably rotatably mounted on said arm, said wheel having a diameter corresponding inversely in a predetermined relationship to the width of the agricultural equipment,
    a meter rigidly mounted on said securing means for converting revolutions of said drive wheel into visible indicia designating areal expanse traversed by said agricultural equipment,
    flexible means connected between said drive wheel and said meter for transmitting wheel revolutions therebetween, and
    adjustable means for limiting downwardly swinging pivotal movement of said wheel support arm.

3. The apparatus of claim 2 wherein said meter further includes means for indicating equipment ground speed.

4. The device of claim 2 wherein said adjustable means comprises a brace arm rigidly carried by said securing means and projecting above said pivoted wheel support arm, and flexible means connected between said arms to limit downward swinging movement of said wheel support arm relative to said brace arm when said equipment is elevated from operative association with the ground during transport.

References Cited by the Examiner
UNITED STATES PATENTS

| | | | |
|---|---|---|---|
| 583,260 | 5/1897 | Kelly | 235—95 |
| 592,911 | 11/1897 | Howland | 235—95 |
| 745,726 | 12/1903 | Hathaway | 235—95 |
| 2,327,657 | 8/1943 | Middleton. | |
| 2,343,385 | 3/1944 | Milestone et al. | 235—94 X |
| 2,580,538 | 1/1952 | Gentsch | 235—95 |
| 2,665,897 | 1/1954 | Mollenhour | 235—95 X |
| 2,724,361 | 11/1955 | Coffin | 235—95 X |
| 2,772,832 | 12/1956 | Lassiter | 235—95 |

LOUIS J. CAPOZI, *Primary Examiner*.

LEO SMILOW, *Examiner*.

C. G. COVELL, *Assistant Examiner*.